(12) United States Patent
Wang et al.

(10) Patent No.: US 11,607,050 B2
(45) Date of Patent: Mar. 21, 2023

(54) INTEGRATED FOLDING FOOT REST AND LEG FOLDING MECHANISM THEREOF

(71) Applicant: ZHEJIANG HUAFENG ELECTRIC TOOLS CO., LTD, Jinhua (CN)

(72) Inventors: Li Wang, Jinhua (CN); Hui Wang, Jinhua (CN); Huajun Xin, Jinhua (CN)

(73) Assignee: ZHEJIANG HUAFENG ELECTRIC TOOLS CO., LTD, Jinhua (CN)

( * ) Notice: Subject to any disclaimer, the term of this patent is extended or adjusted under 35 U.S.C. 154(b) by 0 days.

(21) Appl. No.: 17/640,837

(22) PCT Filed: Oct. 31, 2019

(86) PCT No.: PCT/CN2019/114850
§ 371 (c)(1),
(2) Date: Mar. 7, 2022

(87) PCT Pub. No.: WO2021/077457
PCT Pub. Date: Apr. 29, 2021

(65) Prior Publication Data
US 2022/0338638 A1  Oct. 27, 2022

(30) Foreign Application Priority Data
Oct. 22, 2019  (CN) .......................... 201911006535.9

(51) Int. Cl.
*A47C 16/02*  (2006.01)
(52) U.S. Cl.
CPC .................. *A47C 16/025* (2013.01)
(58) Field of Classification Search
CPC .... B25H 1/04; B25H 1/16; B25H 1/18; A47B 3/002; A47B 3/14; F16M 11/16; A47C 16/025
See application file for complete search history.

(56) References Cited

U.S. PATENT DOCUMENTS

| 4,605,099 A * | 8/1986 | Crum ...................... B25H 1/06 182/186.3 |
| 7,703,726 B2 | 4/2010 | Harrison et al. |
| 2022/0178153 A1* | 6/2022 | Woodward ................ E06C 1/39 |

FOREIGN PATENT DOCUMENTS

| CN | 2630620 Y | 8/2004 |
| CN | 203336181 U | 12/2013 |

(Continued)

OTHER PUBLICATIONS

KR20170124330A, Son Jae Woo, May 2016.*

*Primary Examiner* — Sarah B McPartlin
(74) *Attorney, Agent, or Firm* — Bayramoglu Law Offices LLC

(57) ABSTRACT

An integrated folding foot rest includes a table-board supporting seat, the bottom of which is provided with four break angle bending portions. Each of the break angle bending portions is connected to a leg folding mechanism. The leg folding mechanism includes a pedestal, a rotating seat and a leg. The pedestal is formed by symmetrically splicing a front pedestal and a back pedestal. Lower portions of the front and back pedestals are respectively provided with rotary limiting grooves, and two end portions of the rotary limiting grooves are respectively provided with limiting ends. One side of the rotating seat is provided with a telescopic slideway, the telescopic slideway is internally provided with a T-shaped locking piece, two ends of a limiting portion of the locking piece are correspondingly embedded into the rotary limiting grooves, respectively, and a pressure spring is annularly sleeved on the telescopic portion of the locking piece.

14 Claims, 7 Drawing Sheets

(56) References Cited

FOREIGN PATENT DOCUMENTS

| CN | 204295557 U | 4/2015 |
| CN | 206409858 U | 8/2017 |
| CN | 208764612 U | 4/2019 |

* cited by examiner

INTEGRATED FOLDING FOOT REST AND LEG FOLDING MECHANISM THEREOF

CROSS REFERENCE TO THE RELATED APPLICATIONS

This application is the national phase entry of International Application No. PCT/CN2019/114850, filed on Oct. 31, 2019, which is based upon and claims priority to Chinese Patent Application No. 201911006535.9, filed on Oct. 22, 2019, the entire contents of which are incorporated herein by reference.

TECHNICAL FIELD

The present invention belongs to a table tool support structure, and in particular relates to an integrated folding foot rest and a leg folding mechanism thereof adaptive to a table tool.

BACKGROUND

In a woodworking process, in order to provide a stable operating environment and a proper operating height, some table tools are often provided with foldable and liftable foot rests. The prior foot rest structures are usually structured such that hinge structures are matched with positioning structures, and the foot rest structures cannot be placed stably after being folded. Therefore, technical staff of our unit have improved the foot rest structures.

SUMMARY

Aiming at the deficiency that the foot rest of the prior table tool cannot be placed and supported stably after being folded, the present invention provides an integrated folding foot rest. A folding mechanism for legs is improved primarily. A folding mode is as follows: a locking piece is pressed manually to control relative positions of a head of the locking piece and a rotary limiting groove, thereby rotating and locking the legs. After the folding foot rest is folded, the whole table tool can be still placed and supported stably. The folded table tool can be directly placed on a worktable top integrally to operate, thereby providing a proper operating height and a comfortable operating environment. Furthermore, the folding mechanism is additionally provided with assistant feet capable of being matched with the table-board. After operation, the folded table tool is placed on the side, and the edge of the table-board and the assistant feet form a supporting surface so that the table tool can land on the side integrally and can be placed stably, and it is convenient to store the table tool.

The above-mentioned technical problem of the present invention is solved below via the technical scheme as follows: a leg folding mechanism includes a pedestal, a rotating seat hinged to the pedestal, and a leg connected to the rotating seat, where the pedestal is formed by symmetrically splicing a front pedestal and a back pedestal, the front pedestal includes a plate and an edgefold in the periphery of the plate, the back pedestal includes a plate and an edgefold in the periphery of the plate, and the plate of the front pedestal and the plate of the back pedestal are respectively provided with hinge holes or hinge shaft sleeves; an upper portion of the rotating seat is located between the front pedestal and the back pedestal in the pedestal, an upper end of the rotating seat is provided with a hinge hole, and the front pedestal, the back pedestal and the rotating seat are rotatably hinged via a shaft, where a lower portion of the front pedestal and a lower portion of the back pedestal are respectively provided with an arc-shaped rotary limiting groove, the two rotary limiting grooves are aligned horizontally, and two end portions of each of the rotary limiting grooves are respectively provided with limiting ends that are relatively obliquely extended outwards;

one side of the rotating seat is provided with a hollowed telescopic slideway, the telescopic slideway extends obliquely downwards from a hinged part of the rotating seat to a lower middle part of the rotating seat, a lower end of the telescopic slideway is provided with a mounting sleeve, the mounting sleeve is internally provided with an axial through center hole, the center hole is communicated with the telescopic slideway, and the axial direction of the center hole is consistent with the axial direction of the telescopic slideway;

the telescopic slideway is internally provided with a T-shaped locking piece, the locking piece includes a transverse limiting portion and a vertical telescopic portion, the telescopic portion is located in the telescopic slideway, and the limiting portion is exposed out of the telescopic slideway; and two ends of the limiting portion of the locking piece are correspondingly embedded into the rotary limiting grooves in the front pedestal and the back pedestal, respectively; and a lower end of the telescopic portion of the locking piece extends to the mounting sleeve, the lower end of the telescopic portion is connected to a button, an outer end of the button is exposed out of the mounting sleeve, a pressure spring is annularly sleeved on the telescopic portion of the locking piece, and the pressure spring is located between the lower end of the telescopic slideway and the button.

Under the action of the pressure spring, the button is pressed manually to drive the locking piece to move in the telescopic slideway in a telescopic manner, so as to control the relative positions of the head of the locking piece and the rotary limiting grooves. When the head of the locking piece is at the limiting end of the rotary limiting groove, the leg is locked and cannot rotate. When the locking piece is separated from the limiting end of the rotary limiting groove, the leg can rotate.

Preferably, a side of a lower portion of the pedestal adjacent to the mounting sleeve is provided with assistant feet protruding relatively outwards. The assistant feet extend transversely relative to the legs, and the assistant feet and the edge of the table-board of the table tool are matched to form a supporting surface, so that the folded table tool can be placed laterally, vertically and stably. After the legs are folded, if the table tool is placed horizontally, the lower end of the pedestal serves as a supporting point.

Preferably, the rotary limiting grooves are respectively located on the inner sides of the front pedestal and the back pedestal and the rotary limiting grooves are formed by recessing inner surfaces relatively inwards, thus, two ends of the T-shaped head of the locking piece are embedded into the recessing portions correspondingly; or, the rotary limiting grooves are hollowed, thus, the two ends of the T-shaped head of the locking piece are embedded into the hollowed portions correspondingly.

Preferably, the rotary limiting grooves are formed in arc shapes opened upwards, and the limiting ends at two ends extend obliquely downwards. The locking piece is located below the rotary limiting groove, and when the T-shaped head of the locking piece is located in the limiting end, the locking piece is pulled downwards under the action of the pressure spring; and if the locking piece is to be separated from the limiting end, an external force relatively upwards is needed to resist the pressure spring.

Preferably, the lower portion of the rotating seat is a hollow jointing sleeve, the jointing sleeve is exposed out of the pedestal, and the upper end of the leg is inserted into the jointing sleeve; or, the lower portion of the rotating seat is a columnar jointing piece, the jointing piece is exposed out of the pedestal, and the upper end of the leg is hollow and is connected to the jointing piece in an annularly sleeved manner.

An integrated folding foot rest includes a table-board supporting seat configured to support a table-board, where the bottom of the table-board supporting seat is provided with four break angle bending portions, and each of the break angle bending portions is connected to the leg folding mechanism described as above.

Preferably, the table-board supporting seat includes a front supporting seat and a back supporting seat that are parallel; the front supporting seat is arranged as an upward opened frame with three sides surrounding and one side being opened; the front supporting seat includes a first transverse rod located at the middle, a second rod piece connected to one end of the first transverse rod and extending upwards, and a third rod piece connected to the other end of the first transverse rod and extending upwards; a connection between the first transverse rod and the second rod piece is formed with a break angle bending portion, and a connection between the first transverse rod and the third rod piece is formed with a break angle bending portion; and the back supporting seat and the front supporting seat are same in structure. The table tool is usually provided with four angle bending portions, and angles of the angle bending portions are usually right angles, or acute angles slightly smaller than the right angles, or obtuse angles slight larger than right angles.

Preferably, the upper end of the front pedestal is provided with a first fixing portion extending upwards and a second fixing portion extending obliquely upwards or downwards, and symmetrically, the upper end of the back pedestal is provided with a first fixing portion extending upwards and a second fixing portion extending obliquely upwards or downwards; the first fixing portions and the second fixing portions are diverged at angles; the first fixing portions are correspondingly connected to the second rod piece or the third rod piece of the front supporting seat, the second fixing portions are correspondingly connected to the first transverse rod of the front supporting seat, and the bending portion of the front supporting seat is clamped and coated between the upper portions of the front pedestal and the back pedestal.

Preferably, the first fixing portion includes a plate extending upwards and an edgefold at a periphery of the plate, where the plate is provided with a fixing hole or a fixing column protruding horizontally, the edgefold at the uppermost end is provided with a recessing notch, and after the front pedestal and the back pedestal are spliced symmetrically, the second rod piece or the third rod piece penetrates through the notch; the second fixing portion includes a plate extending obliquely downwards and an edgefold at a periphery of the plate, where the plate is provided with a fixing hole or a fixing column protruding horizontally, and the edgefold at the end portion is provided with a recessing notch, and after the front pedestal and the back pedestal are spliced symmetrically, the first transverse rod penetrating through the notch; a position of the lower end of the second rod piece adjacent to the bending portion is correspondingly provided with a fixing hole, a position of the lower end of the third rod piece adjacent to the bending portion is correspondingly provided with a fixing hole, and positions of two ends of the first transverse rod adjacent to the bending portion are correspondingly provided with fixing holes, respectively. During assembly, the fixing column on the plate penetrates through the fixing hole in the rod piece and is then connected to the fixing hole in the plate corresponding thereto.

Preferably, the assistant feet on the pedestal are located on a side back to the second rod piece or the third rod piece. The folded table tool is placed laterally and vertically, and the assistant feet and the edge of the table-board jointly form stable support.

In conclusion, compared with the prior art, the present invention has the advantages as follows.

The folding mechanism of the foot rest of the present invention is improved. A specific folding mode is as follows: a locking piece is pressed manually to control relative positions of a head of the locking piece and a rotary limiting groove, thereby, rotating and locking the legs. The folded foot rest can still be placed and supported stably, and the folded table tool can be directly placed on a worktable top integrally to operate, thereby providing a proper operating height and a comfortable operating environment. The folding mechanism is additionally provided with assistant feet capable of being matched with the table-board. After operation, the folded table tool is placed on the side, and the edge of the table-board and the assistant feet form a supporting surface, so that the table tool can land on the side integrally and can be placed stably, and it is convenient to store the table tool.

Figure 1:
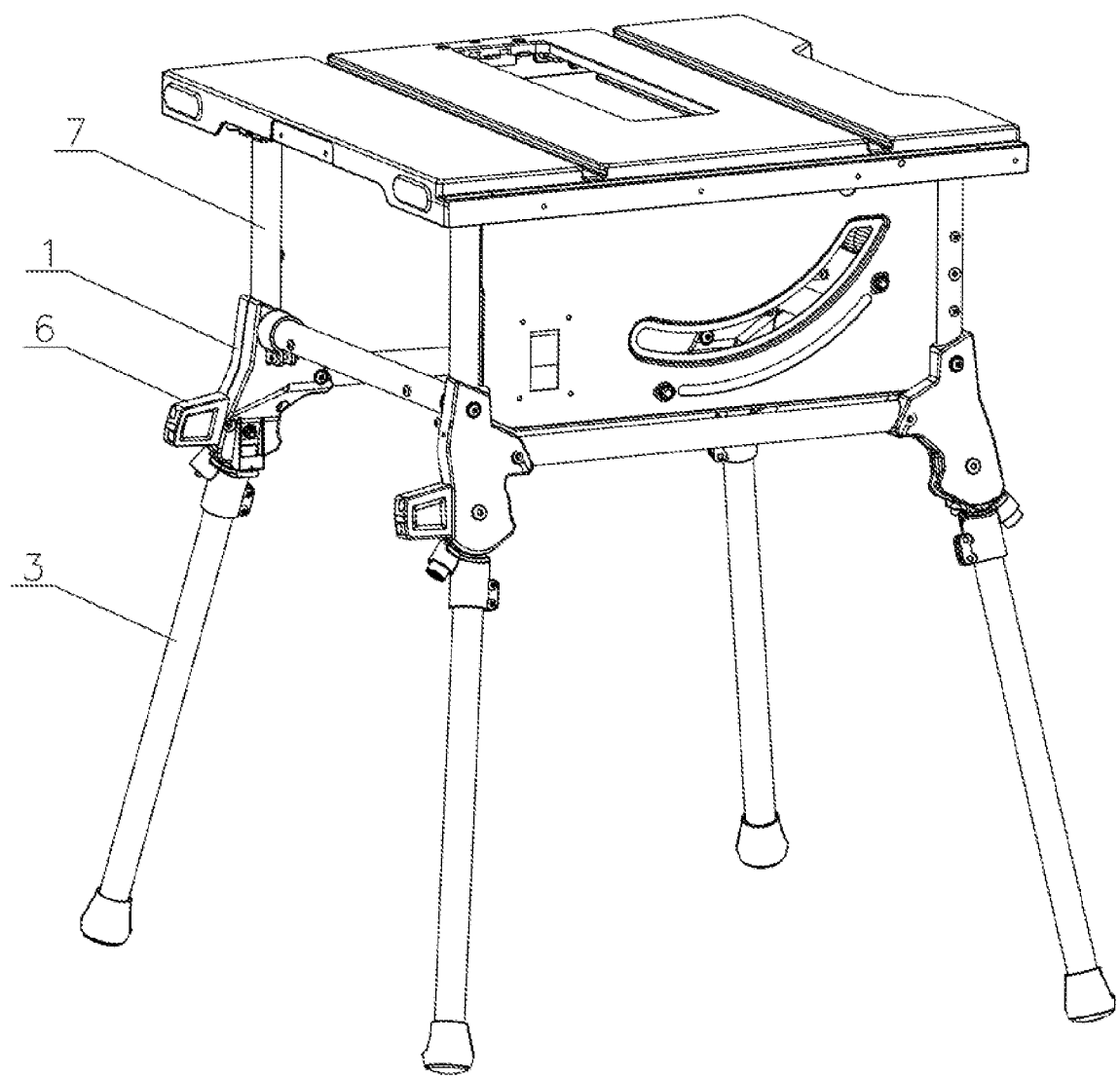
FIG. 1 is a schematic diagram of a using state of the present invention.

Numerals in the drawings: 1, pedestal; 11, front pedestal; 12, back pedestal; 13, first fixing portion; 14, second fixing portion; 15, fixing column; 16, notch; 17, fixing hole; 2, rotating seat; 21, telescopic slideway; 22, mounting sleeve; 23, locking piece; 24, button; 25, pressure spring; 26, jointing sleeve; 3, leg; 4, shaft; 5, rotary limiting groove; 51, limiting end; 6, assistant foot; 7, table-board supporting seat; 70, front supporting seat; 71, first transverse rod; 72, second rod piece; 73, third rod piece; 74, back supporting seat.

DETAILED DESCRIPTION OF THE EMBODIMENTS

Further description of the present invention will be made below in combination with drawings and embodiments.

Embodiment 1

Figure 2:
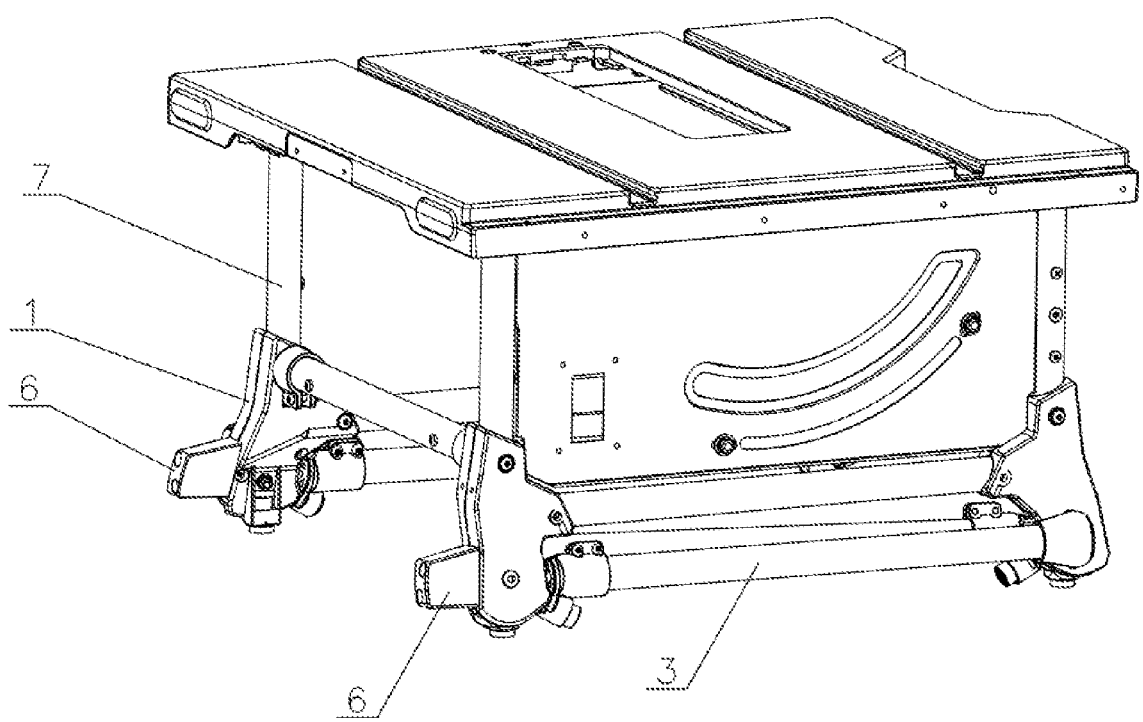
FIG. 2 is a schematic diagram of a folded state of the present invention.
Figure 3:
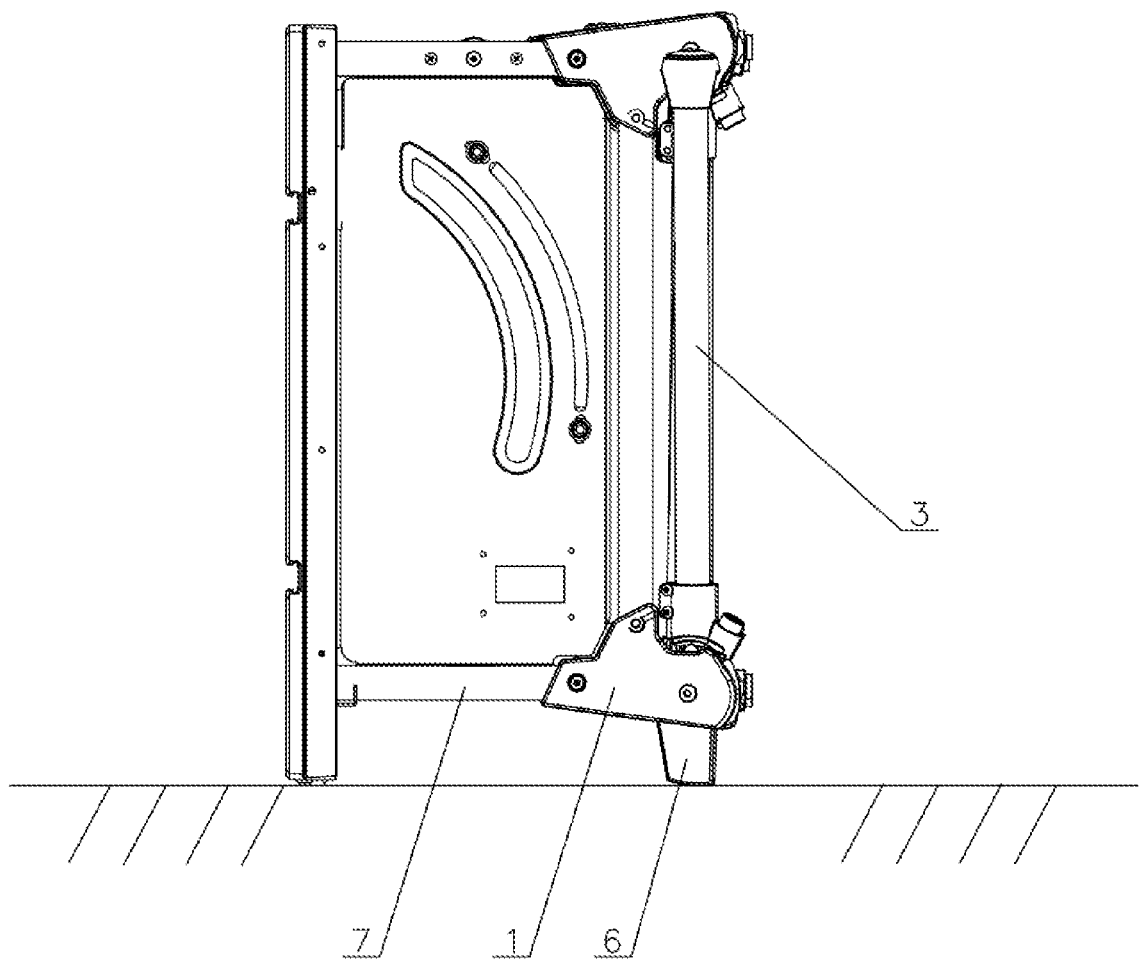
FIG. 3 is a side supporting schematic diagram of the present invention.
Figure 4:
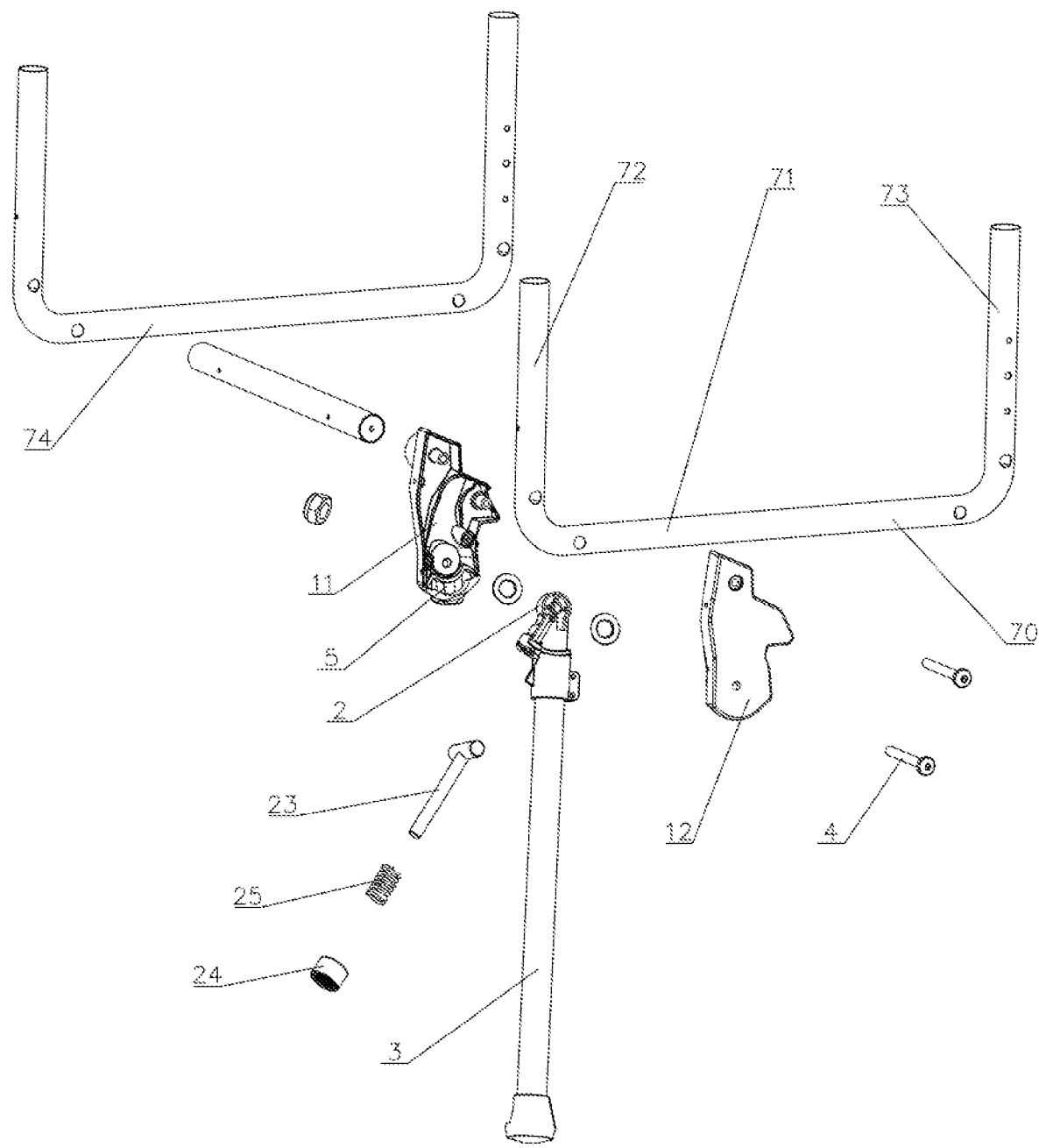
FIG. 4 is an exploded view of the present invention.
Figure 5:
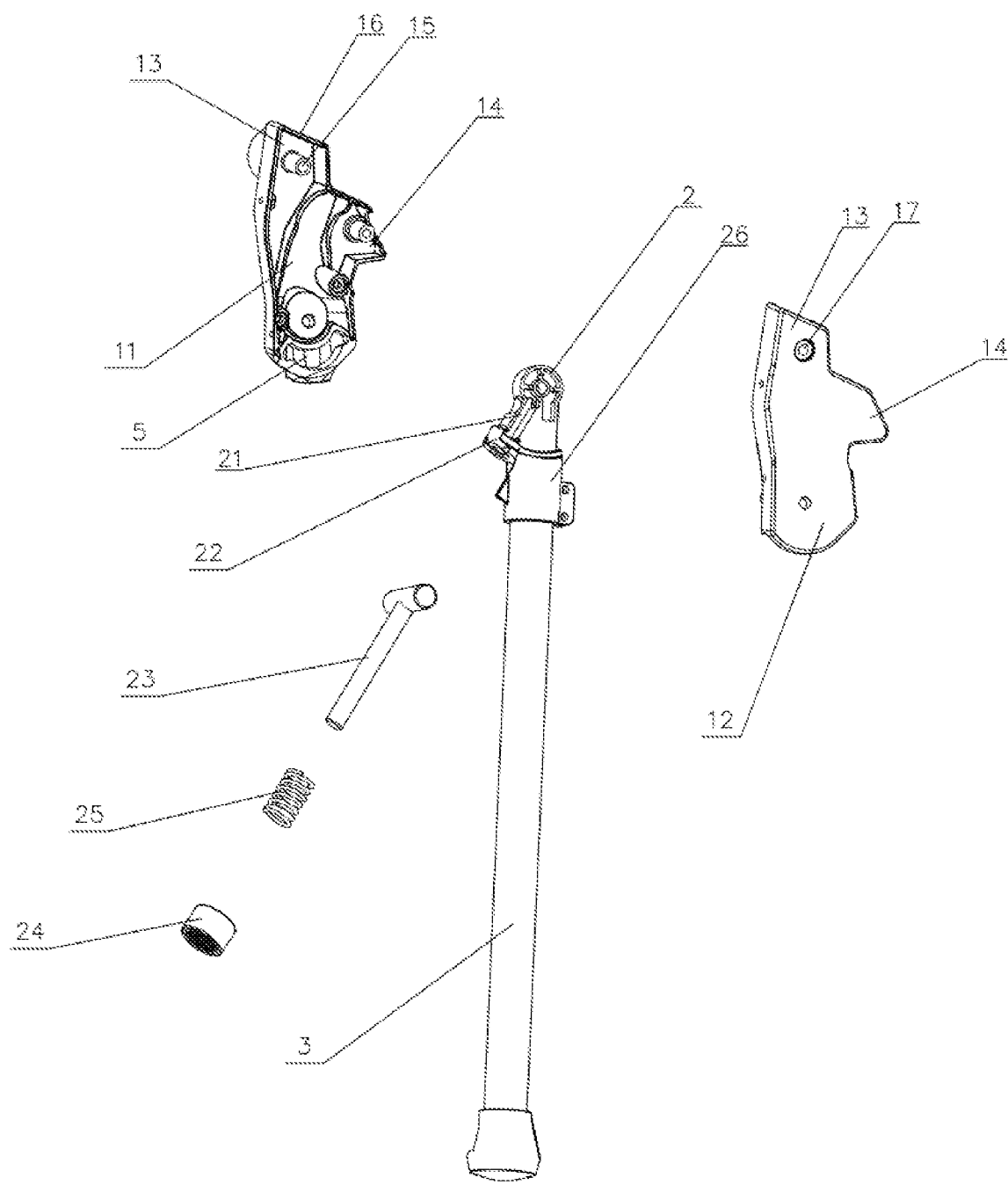
FIG. 5 is a partial exploded view of the present invention.
Figure 6:
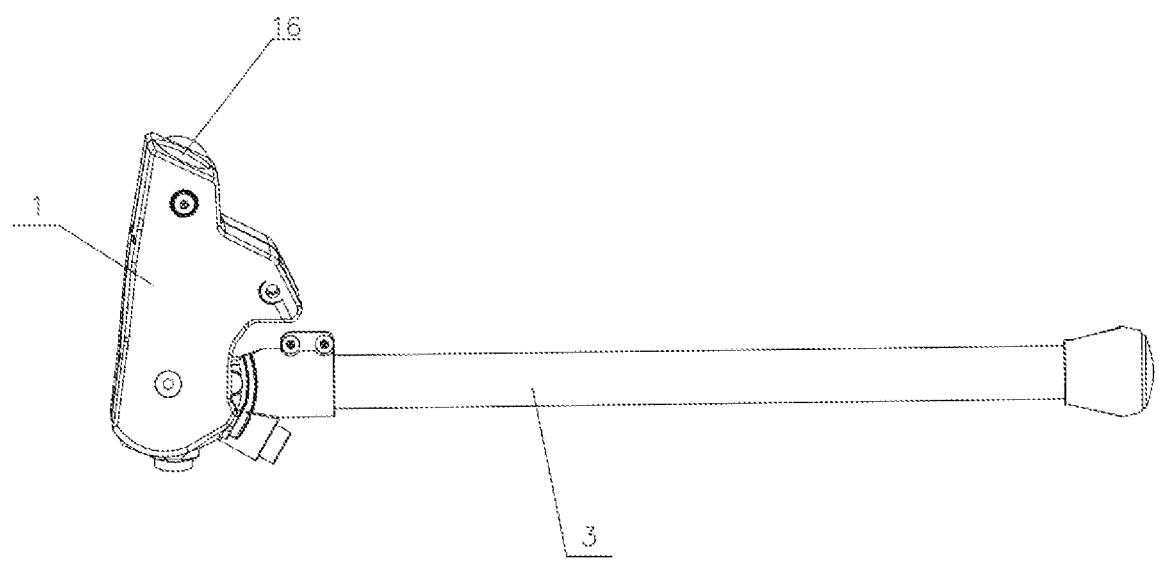
FIG. 6 is a schematic diagram of a leg folding mechanism in a folded state of the present invention.
Figure 7:
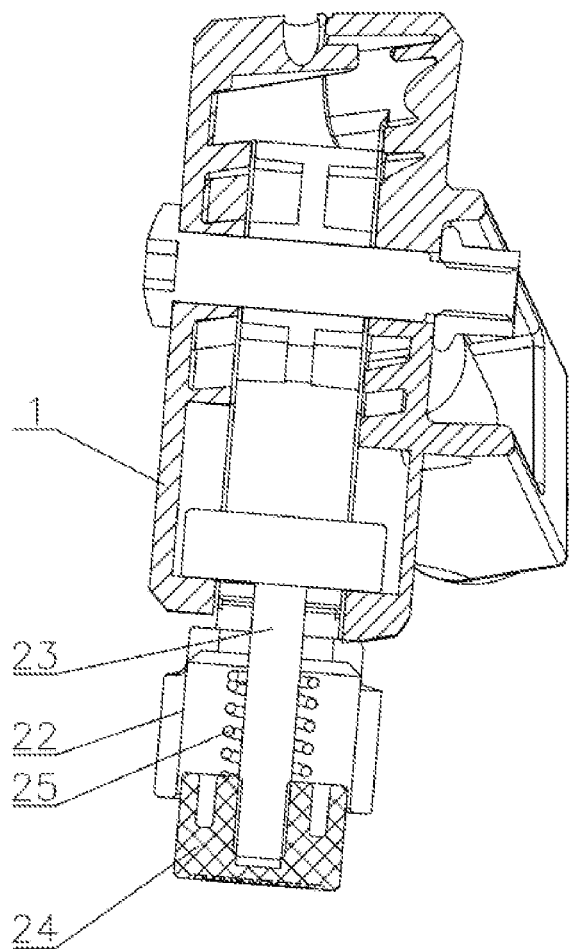
FIG. 7 is a side section view of a leg folding mechanism of the present invention.
Figure 8:
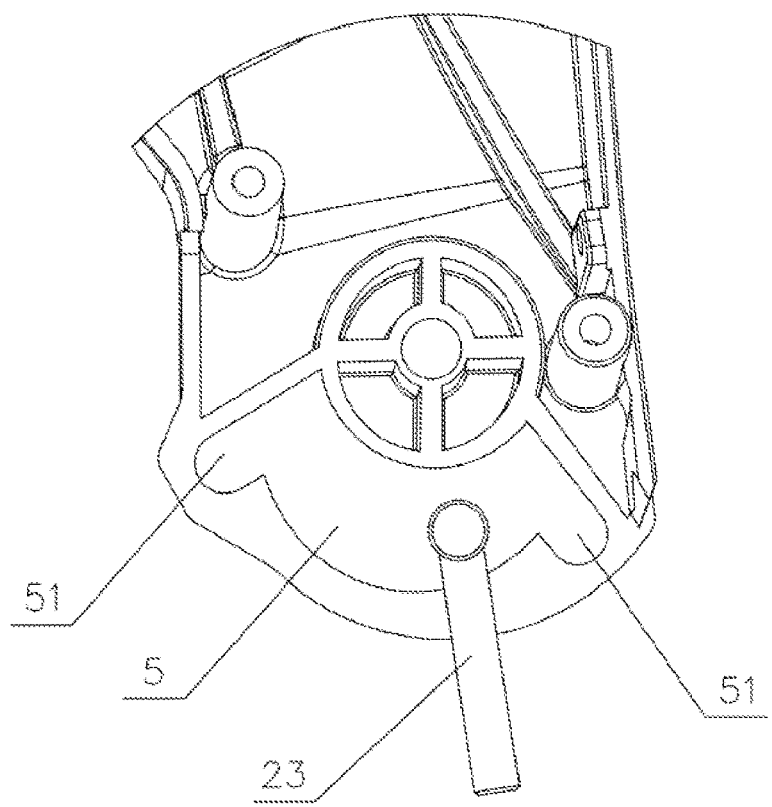
FIG. 8 is a schematic diagram of a locking piece and a rotary limiting groove matched in a rotating state of the present invention.
Figure 9:
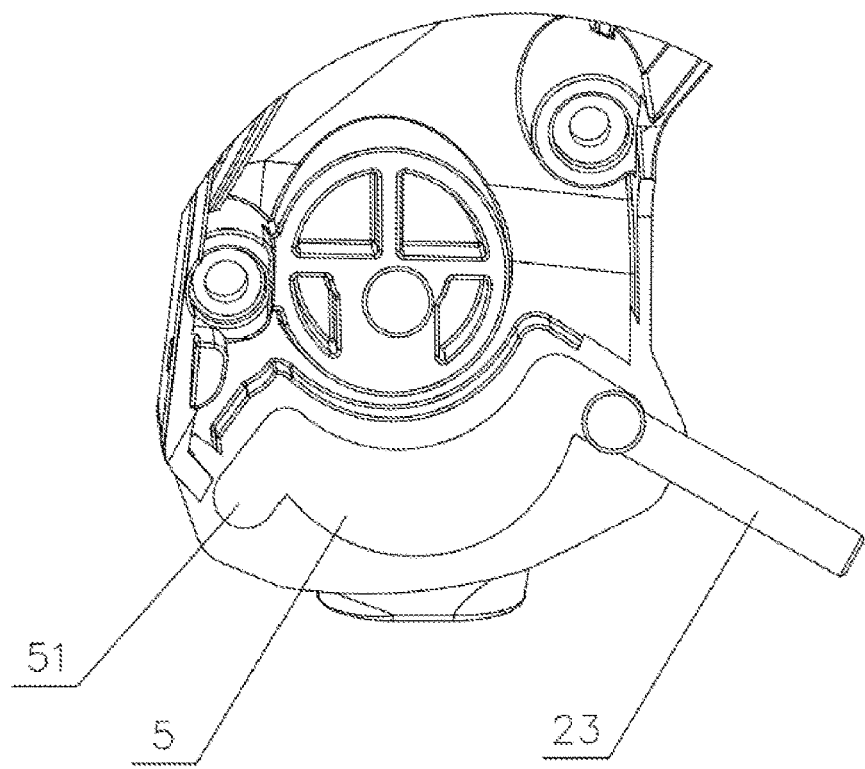
FIG. 9 is a schematic diagram of a locking piece and a rotary limiting groove matched in a locked state of the present invention.

As shown in FIG. 1 to FIG. 9, an integrated folding foot rest is applied to a table tool to support a table-board. The table-board is supported by the table-board supporting seat 7 located below the table-board. The table-board supporting seat 7 includes the front supporting seat 70 and the back supporting seat 74 that are parallel. The front supporting seat 70 is formed by bending a hollow round pipefitting and is in a U shape opened upwards; the middle of the front supporting seat 70 is the horizontal first transverse rod 71, one end of the first transverse rod 71 is provided with the second rod piece 72 relatively perpendicular upwards, and the other end of the first transverse rod 71 is provided with the third rod piece 73 relatively perpendicular upwards, i.e., a transition part of the first transverse rod 71 and the second rod piece 72 is bent at a right angle and is rounded off, and a transition part of the first transverse rod 71 and the third rod piece 73 is bent at a right angle and is rounded off.

The position of the lower end of the second rod piece 72 adjacent to the bending portion is correspondingly provided with the fixing hole 17, the position of the lower end of the third rod piece 73 adjacent to the bending portion is correspondingly provided with the fixing hole 17, and positions of two ends of the first transverse rod 71 adjacent to the bending portion are correspondingly provided with fixing holes 17, respectively.

The back supporting seat 74 and the front supporting seat 70 are same in structure. The bottom of the table-board supporting seat 7 is provided with four right angle bending portions, where each of the right angle bending portions is fixed with the leg folding mechanism.

The leg folding mechanism includes a pedestal 1, a rotating seat 2 hinged to the pedestal 1, and a leg 3 connected to the rotating seat 2. The pedestal 1 is formed by symmetrically splicing a front pedestal 11 and a back pedestal 12, and the front pedestal 11 and the back pedestal 12 are relatively clamped at the bending portion of the table-board supporting seat 7.

Specifically, the upper end of the front pedestal 11 is provided with a first fixing portion 13 extending upwards and a second fixing portion 14 extending obliquely downwards, and symmetrically, the upper end of the back pedestal 12 is provided with a first fixing portion 13 extending upwards and a second fixing portion 14 extending obliquely downwards. The first fixing portions 13 and the second fixing portions 14 are diverged at obtuse angles.

The first fixing portion 13 of the front pedestal 11 includes a plate extending upwards and an edgefold at a periphery of the plate, where the plate is provided with a fixing column 15 protruding horizontally, and the edgefold at the uppermost end is provided with a recessing arc-shaped notch 16. The second fixing portion 14 of the front pedestal 11 includes a plate extending obliquely downwards and an edgefold at a periphery of the plate, where the plate is provided with a fixing column 15 protruding horizontally, and the edgefold at the end portion is provided with a recessing arc-shaped notch 16.

The first fixing portion 13 of the back pedestal 12 includes a plate extending upwards and an edgefold at a periphery of the plate, where the plate is provided with a fixing hole 17, and the edgefold at the uppermost end is provided with a recessing arc-shaped notch 16. The second fixing portion 14 of the back pedestal 12 includes a plate extending obliquely downwards and an edgefold at a periphery of the plate, where the plate is provided with a fixing hole 17, and the edgefold at the end portion is provided with a recessing arc-shaped notch 16.

During assembly, the front pedestal 11 and the back pedestal 12 are symmetrically spliced to clamp the bending portion of the table-board supporting seat 7 at the middle, where the first fixing portion 13 is correspondingly connected to the second rod piece 72 or the third rod piece 73, and the second fixing portion 14 is correspondingly connected to the first transverse rod 71, while the fixing column 15 of the first fixing portion 13 and the fixing column 15 of the second fixing portion 14 of the front pedestal 11 penetrate through the fixing holes 17 of the second rod piece 72 and the third rod piece 73 correspondingly, and furthermore, the fixing columns 15 of the front pedestal 11 are connected to the corresponding fixing holes 17 of the back pedestal 12.

The middle of the plate of the front pedestal 11 is provided with a hollow cylindrical connecting column protruding horizontally, and the middle of the plate of the back pedestal 12 is provided with an annular sleeve. During assembly, the connecting column and the annular sleeve are spliced. The lower portions of the plate of the front pedestal 11 and the plate of the back pedestal 12 are respectively provided with hinge shaft sleeves with holes, a shaft 4 is connected to the hinge shaft sleeves, and the shaft 4 serves as a rotary hinging center.

The lower portion of the front pedestal 11 and the lower portion of the back pedestal 12 are respectively provided with arc-shaped rotary limiting grooves 5 opened upwards, the two rotary limiting grooves 5 are aligned horizontally, the two rotary limiting grooves 5 are respectively located on the inner sides of the front pedestal 11 and the back pedestal 12, the rotary limiting grooves 5 are formed by recessing inner surfaces relatively inwards, two end portions of each of the rotary limiting grooves 5 are respectively provided with limiting ends 51 that are relatively obliquely extended outwards, and the limiting ends 51 at two ends extends downwards relatively obliquely.

The rotating seat 2 is hinged between the lower portions of the front pedestal 11 and the back pedestal 12, the upper portion of the rotating seat 2 is located between the front pedestal 11 and the back pedestal 12 in the pedestal 1, the upper end of the rotating seat 2 is provided with a hinge hole and is connected to the shaft 4 in an annularly sleeved manner, and the front pedestal 11, the back pedestal 12 and the rotating seat 2 are rotatably hinged via the shaft 4.

The lower portion of the rotating seat 2 is a hollow jointing sleeve 26, the jointing sleeve 26 is exposed out of the pedestal 1, and the upper end of the leg 3 is inserted into the jointing sleeve 26.

The upper side of the rotating seat 2 is provided with a hollowed telescopic slideway 21, the telescopic slideway 21 extends obliquely downwards from a hinged part of the rotating seat 2 to a lower middle part of the rotating seat 2, a lower end of the telescopic slideway 21 is provided with a cylindrical hollow mounting sleeve 22, the mounting sleeve 22 is internally provided with an axial through center hole, the center hole is communicated with the telescopic slideway 21, and the axial direction of the center hole is consistent with the axial direction of the telescopic slideway 21.

The telescopic slideway 21 is internally provided with a T-shaped locking piece 23, the locking piece 23 includes a transverse limiting portion and a vertical telescopic portion, the telescopic portion is located in the telescopic slideway 21, and the limiting portion is exposed out of the telescopic slideway 21. Two ends of the limiting portion of the locking piece 23 are correspondingly embedded into the rotary limiting grooves 5 in the front pedestal 11 and the back pedestal 12, respectively.

A lower end of the telescopic portion of the locking piece 23 extends to the mounting sleeve 22, the lower end of the telescopic portion is connected to a button 24, an outer end of the button 24 is exposed out of the mounting sleeve 22, a pressure spring 25 is annularly sleeved on the telescopic portion of the locking piece 23, the pressure spring 25 is located between the lower end of the telescopic slideway 21 and the button 24, and the button 24 is pressed to drive the locking piece 23 to perform telescopic translation integrally.

One side of the lower portion of the pedestal 1 back to the second rod piece 72 or the third rod piece 73 is fixedly connected to assistant feet 6, and the assistant feet 6 protrude outwards relatively transversely and are matched with the edge of the table-board to form a supporting surface.

The lower end of the pedestal 1 is provided with a protruding foot pad.

The specific embodiments described herein are merely illustrations of spirit of the present invention. Various modifications or supplements can be made on the described specific embodiments or can be replaced in a similar manner by those skilled in the art without deviating from the spirit of the present invention or surpassing the scope defined by the attached claims.

What is claimed is:

1. A leg folding mechanism, comprising a pedestal, a rotating seat hinged to the pedestal, and a leg connected to the rotating seat, wherein the pedestal is formed by symmetrically splicing a front pedestal and a back pedestal, the front pedestal comprises a plate and an edgefold in a periphery of the plate, the back pedestal comprises a plate and an edgefold in a periphery of the plate, and the plate of the front pedestal and the plate of the back pedestal are respectively provided with hinge holes or hinge shaft sleeves; an upper portion of the rotating seat is located between the front pedestal and the back pedestal in the pedestal, an upper end of the rotating seat is provided with a hinge hole, and the front pedestal, the back pedestal and the rotating seat are rotatably hinged via a shaft, wherein a lower portion of the front pedestal and a lower portion of the back pedestal are respectively provided with an arc-shaped rotary limiting groove, the two rotary limiting grooves are aligned horizontally, and two end portions of each of the rotary limiting grooves are respectively provided with limiting ends that are relatively obliquely extended outwards;

one side of the rotating seat is provided with a hollowed telescopic slideway, the telescopic slideway extends obliquely downwards from a hinged part of the rotating seat to a lower middle part of the rotating seat, a lower end of the telescopic slideway is provided with a mounting sleeve, the mounting sleeve is internally provided with an axial through center hole, the center hole is communicated with the telescopic slideway, and an axial direction of the center hole is consistent with an axial direction of the telescopic slideway; the telescopic slideway is internally provided with a T-shaped locking piece, the locking piece comprises a transverse limiting portion and a vertical telescopic portion, the telescopic portion is located in the telescopic slideway, and the limiting portion is exposed out of the telescopic slideway; and two ends of the limiting portion of the locking piece are correspondingly embedded into the rotary limiting grooves in the front pedestal and the back pedestal, respectively; and a lower end of the telescopic portion of the locking piece extends to the mounting sleeve, the lower end of the telescopic portion is connected to a button, an outer end of the button is exposed out of the mounting sleeve, a pressure spring is annularly sleeved on the telescopic portion of the locking piece, and the pressure spring is located between the lower end of the telescopic slideway and the button.

2. The leg folding mechanism according to claim 1, wherein a side of a lower portion of the pedestal adjacent to the mounting sleeve is provided with assistant feet protruding relatively outwards.

3. The leg folding mechanism according to claim 1, wherein the rotary limiting grooves are respectively located on inner sides of the front pedestal and the back pedestal and the rotary limiting grooves are formed by recessing inner surfaces relatively inwards; or, the rotary limiting grooves are hollowed.

4. The leg folding mechanism according to claim 3, wherein the rotary limiting grooves are formed in arc shapes opened upwards, and the limiting ends at two ends extend obliquely downwards.

5. The leg folding mechanism according to claim 4, wherein a lower portion of the rotating seat is a hollow jointing sleeve, the jointing sleeve is exposed out of the pedestal, and an upper end of the leg is inserted into the jointing sleeve; or, the lower portion of the rotating seat is a columnar jointing piece, the jointing piece is exposed out of the pedestal, and the upper end of the leg is hollow and is connected to the jointing piece in an annularly sleeved manner.

6. An integrated folding foot rest, comprising a table-board supporting seat configured to support a table-board, wherein a bottom of the table-board supporting seat is provided with four break angle bending portions, and each of the break angle bending portions is connected to the leg folding mechanism as claimed in claim 1.

7. The integrated folding foot rest according to claim 6, wherein the table-board supporting seat comprises a front supporting seat and a back supporting seat that are parallel; the front supporting seat is arranged as an upward opened frame with three sides surrounding and one side being opened; the front supporting seat comprises a first transverse rod located at a middle, a second rod piece connected to one end of the first transverse rod and extending upwards, and a third rod piece connected to the other end of the first transverse rod and extending upwards; a connection between the first transverse rod and the second rod piece is formed with a break angle bending portion, and a connection between the first transverse rod and the third rod piece is formed with a break angle bending portion; and the back supporting seat and the front supporting seat are same in structure.

8. The integrated folding foot rest according to claim 7, wherein an upper end of the front pedestal is provided with a first fixing portion extending upwards and a second fixing portion extending obliquely upwards or downwards, and symmetrically, an upper end of the back pedestal is provided with a first fixing portion extending upwards and a second fixing portion extending obliquely upwards or downwards; the first fixing portions and the second fixing portions are diverged at angles; the first fixing portions are correspondingly connected to the second rod piece or the third rod piece of the front supporting seat, the second fixing portions are correspondingly connected to the first transverse rod of the front supporting seat, and the bending portion of the front supporting seat is clamped between upper portions of the front pedestal and the back pedestal.

9. The integrated folding foot rest according to claim 8, wherein the first fixing portion comprises a plate extending upwards and an edgefold at a periphery of the plate, wherein the plate is provided with a fixing hole or a fixing column protruding horizontally, and the edgefold at an uppermost end is provided with a recessing notch; the second fixing portion comprises a plate extending obliquely downwards and an edgefold at a periphery of the plate, wherein the plate is provided with a fixing hole or a fixing column protruding horizontally, and the edgefold at an end portion is provided with a recessing notch; a position of a lower end of the second rod piece adjacent to the bending portion is correspondingly provided with a fixing hole, a position of a lower end of the third rod piece adjacent to the bending portion is correspondingly provided with a fixing hole, and positions of two ends of the first transverse rod adjacent to the bending portion are correspondingly provided with fixing holes, respectively.

10. The integrated folding foot rest according to claim 6, wherein the assistant feet on the pedestal are located on a side back to the second rod piece or the third rod piece.

11. The integrated folding foot rest according to claim 6, wherein a side of a lower portion of the pedestal adjacent to the mounting sleeve is provided with assistant feet protruding relatively outwards.

12. The integrated folding foot rest according to claim 6, wherein the rotary limiting grooves are respectively located on inner sides of the front pedestal and the back pedestal and the rotary limiting grooves are formed by recessing inner surfaces relatively inwards; or, the rotary limiting grooves are hollowed.

13. The integrated folding foot rest according to claim 12, wherein the rotary limiting grooves are formed in arc shapes opened upwards, and the limiting ends at two ends extend obliquely downwards.

14. The integrated folding foot rest according to claim 13, wherein a lower portion of the rotating seat is a hollow jointing sleeve, the jointing sleeve is exposed out of the pedestal, and an upper end of the leg is inserted into the jointing sleeve; or, the lower portion of the rotating seat is a columnar jointing piece, the jointing piece is exposed out of the pedestal, and the upper end of the leg is hollow and is connected to the jointing piece in an annularly sleeved manner.

\* \* \* \* \*